United States Patent
Malecke et al.

[11] Patent Number: 5,612,847
[45] Date of Patent: Mar. 18, 1997

[54] POWER WINDOW CIRCUIT BOARD OVERCURRENT PROTECTION

[75] Inventors: Joseph F. Malecke, South Lyon; Dennis D. Kaufman, Farmington; Derrick Titus, Plymouth, all of Mich.

[73] Assignee: TRW Inc., Lyndhurst, Ohio

[21] Appl. No.: 430,562

[22] Filed: Apr. 28, 1995

[51] Int. Cl.$^6$ ..................................................... H02H 9/00
[52] U.S. Cl. ............................... 361/58; 361/27; 307/10.1; 318/434
[58] Field of Search ................................ 361/58, 23, 24, 361/25, 27, 103, 106; 307/29, 31, 35, 12, 10.1; 318/101, 103, 434; 49/26, 28, 31, 118; 160/291, 291.3

[56] References Cited

U.S. PATENT DOCUMENTS

| | | | |
|---|---|---|---|
| 4,663,537 | 5/1987 | Goldner et al. | 307/10 R |
| 4,725,765 | 2/1988 | Miller | 318/434 |
| 4,922,170 | 5/1990 | Kawasaki et al. | 318/434 |
| 4,983,897 | 1/1991 | Tennant | 318/287 |
| 5,229,695 | 7/1993 | Tsuda et al. | 318/434 |

*Primary Examiner*—Jeffrey A. Gaffin
*Assistant Examiner*—Sally C. Medley
*Attorney, Agent, or Firm*—Tarolli, Sundheim, Covell, Tummino & Szabo

[57] ABSTRACT

A vehicle door (22) has a window (24) capable of being opened and closed. A master power window switch assembly (26) is mountable in an arm rest (28) of the door (22) near a driver of the vehicle. A polyswitch resettable fuse (56) is connected to a printed circuit board (50) of a master power window switch assembly (26) through a jumper terminal (58). An electrically conductive trace (52) is electrically connected to the jumper terminal (58). The polyswitch resettable fuse (56) may be used to limit current in the conductive trace (52) on the circuit board (50). Locating the polyswitch resettable fuse (56) between the power source (40) and the circuit board (50) permits design of the conductive traces (52), (53) and the circuit board electrical components for normal operating currents instead of significantly larger foreseeable motor stall current levels.

2 Claims, 2 Drawing Sheets

POWER WINDOW CIRCUIT BOARD OVERCURRENT PROTECTION

TECHNICAL FIELD

The present invention is directed to a vehicle power window system, and is particularly directed to an apparatus for providing overcurrent protection for a printed circuit board of a master power window switch assembly.

BACKGROUND OF THE INVENTION

Power window control systems in vehicles have individual switches to control an associated motor for opening or closing an associated window. The switches are typically located near the associated window. In addition such systems include a master power window switch assembly. Each window has an associated switch in the master power window switch assembly, hereinafter also referred to as a master switch assembly. The master switch assembly is typically located near the driver of the vehicle and provides individual and/or group control of all the windows in the vehicle.

In power window systems, overcurrent protection provided between individual motors and associated switches is known. Overcurrent protection for each individual motor may be adequate to protect an individual motor circuit from damaging overcurrents, however, individual motor circuit overcurrent protection does not necessarily provide adequate protection for a printed circuit board of the master switch assembly.

Foreseeable operating conditions for a master switch assembly printed circuit board include conducting electrical currents resulting from (i) multiple normal window opening/closing, and/or (ii) multiple electric motor stall conditions. A motor stall condition occurs when the window reaches a mechanical stop, or is prevented from movement, and the window switch is still actuated, thereby continuing to supply current to the motor. Motor stall conditions draw current levels in the motor circuit substantially greater than current levels during normal opening/closing. Further, it is foreseeable that more than one window motor may be in a motor stall condition at the same time. The multiple motor stall condition, and the substantially higher associated current levels, is a factor in circuit design and overcurrent protection design.

For example, a circuit board may conduct 32 amps if all switches are actuated in a normal open/close operation. The same circuit board may experience current levels of 100 amps if all switches are actuated and their associated motors are in a motor stall condition. The foreseeable 100 amp load is an important factor in circuit board design and electrical component design. Consequently, printed circuit board conductive traces and electrical components are designed to withstand the higher potential current levels that may result from foreseeable operating conditions instead of normal operating circuit requirements.

SUMMARY OF THE INVENTION

The present invention provides an apparatus for providing overcurrent protection to a master power window switch printed circuit board. The apparatus comprises an electric power source. A printed circuit board having a conducting interconnection pattern is operatively connected to a plurality of automobile window switches. A polyswitch resettable fuse is electrically interconnected between the power source and the conducting interconnection pattern on the printed circuit board. The polyphase resettable fuse substantially decreases current flow to the printed circuit board when the temperature of the polyswitch resettable fuse is greater than a predetermined threshold value. The predetermined threshold value is functionally related to the positive temperature coefficient of resistance of the material comprising the polyswitch resettable fuse. The polyswitch resettable fuse permits increased current flow to the printed circuit board when the temperature of the polyswitch resettable fuse is less than the predetermined threshold value. The apparatus further comprises a plurality of window motors. Each of the motors is electrically connected to one associated window switch operatively connected to the printed circuit board. The associated window switch supplies current to the associated window motor. Each of the window motors is operatively connected to and associated with a window for, when energized, opening or closing the associated window.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
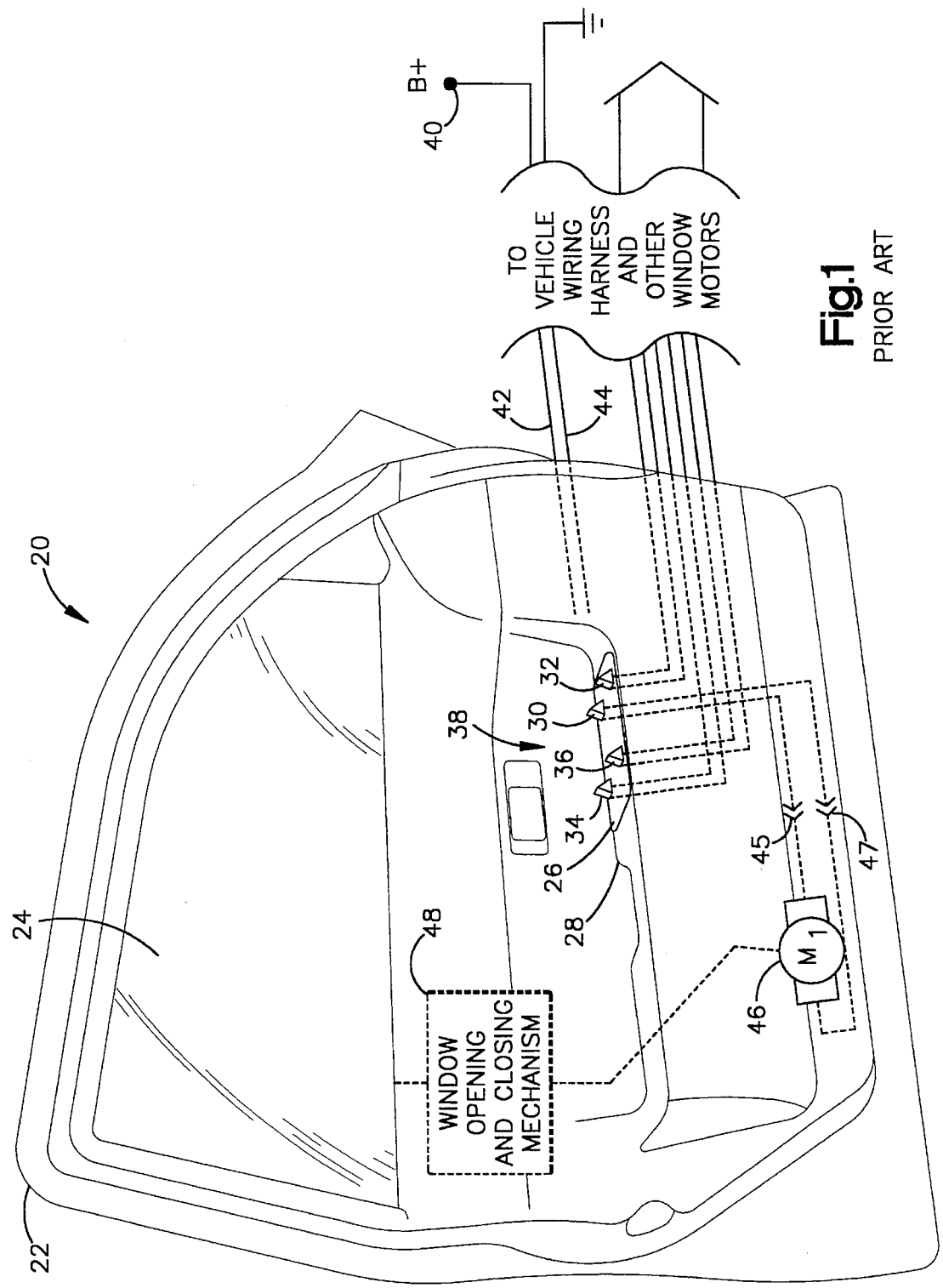
FIG. 1 is a schematic diagram illustrating a master power window switch assembly in accordance with the present invention.

Referring to FIG. 1, an automotive power window system 20 includes a window 24 which is mounted in a door 22 and is capable of being opened and closed. A master power window switch assembly 26 is mountable in an arm rest 28 of the door 22 near a driver of the vehicle. The master power window switch assembly 26 includes master window switches 30, 32, 34, and 36, hereinafter collectively referred to as master switches 38. Master power window switch assembly 26 is electrically connected to (i) a source of vehicle power 40 (B+) through a conductor 42, and (ii) a chassis or frame connection (a ground) through a conductor 44. Master switches 38 are bi-directionally actuated and resiliently biased to return to a central neutral position.

The master switch 30 is electrically connected to (i) an associated electric motor 46 through a connector 45 and a connector 47. Electric motor 46 is a DC motor capable of bi-directional rotation which draws approximately 8 amps during normal operation and approximately 25 amps during a motor stall condition. The motor 46 is operatively connected to a window opening and closing mechanism 48, which is operatively attached to the window 24. Motor 46 and the window opening and closing mechanism 48 operatively cooperate to open and close the window 24 using one of any method known in the art.

Figure 2:
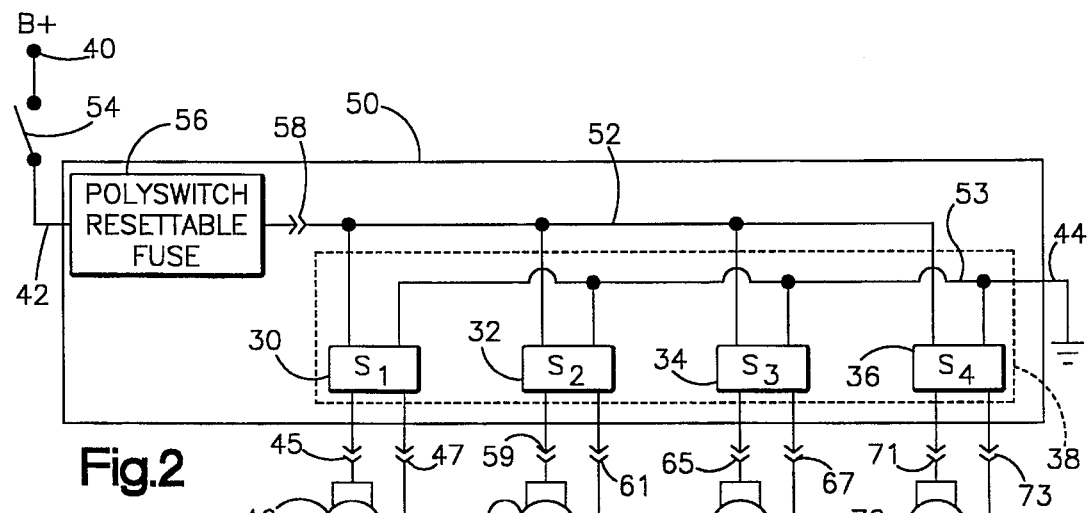
FIG. 2 is a functional block diagram of an overcurrent protection system for a master power window switch assembly printed circuit board in accordance with the present invention.

Referring to FIG. 2, the source of electrical power 40 is electrically connected to an ignition switch 54. Ignition switch 54 is connected to a polyswitch resettable fuse 56 through conductor 42. The polyswitch resettable fuse 56 is preferably a positive temperature coefficient of resistance (PTC) device. A characteristic of a PTC device is a nonlinear change in resistance as a function of device temperature. Once the temperature of the PTC device is greater than a resistance switching temperature, the resistance of the PTC device abruptly changes. The resistance switching temperature is functionally related to (i) the composition of the PTC material, and (ii) the geometry of the device.

A PTC device may be designed, by varying its composition and geometry as is known in the art, such that currents passing through the PTC device greater than a specific current level cause internal $I^2R$ heating of the device. For example, a PTC device may be designed to have $I^2R$ heating when an overcurrent condition occurs in a circuit. An overcurrent condition exists when current levels flowing in a circuit are capable of damaging the circuit components or conductors. The $I^2R$ heating of the PTC device raises its temperature to a level greater than the resistance switching temperature. The resistance of the PTC device increases significantly once the PTC device temperature is greater than the resistance switching temperature. As a result of the increased resistance, the current flow through the PTC device is reduced to a "trickle current." Reduction of the current to a "trickle" and elimination of the overcurrent causing condition in the circuit result in current levels in the PTC device less than those which cause increasing internal $I^2R$ heating. Consequently, the PTC device temperature decreases. The resistance of the PTC device decreases once the PTC device temperature is less than the resistance switching temperature. Normal levels of current may flow as a result of the decreased PTC device resistance.

Polyswitch resettable fuse 56 is mounted on and connected to a printed circuit board 50 for the master power window switch assembly 26 through a jumper terminal 58. An electrically conductive trace 52 is electrically connected to the jumper terminal 58. Conductive trace 52 forms an interconnecting pattern between electrical components on the circuit board 50. Upon actuation of the ignition switch 54 to an ON position, conductive trace 52 distributes power from source 40 to electrical components on the circuit board 50 as described above.

The printed circuit board 50 includes electrically conductive trace 53. Conductive trace 53, electrically isolated from conductive trace 52, interconnects electrical components to a chassis or ground connection. Preferably, the printed circuit board 50 and the conductive traces 52, 53 are designed for a current load of approximately 40 amps. Electrical components electrically connected to the conductive traces 52 and 53 include master switches 30, 32, 34 and 36. It is to be understood that other circuit components may be interconnected by traces 52 and 53, e.g. auto window up/down electronics.

As described above, the master switch 30 is electrically connected to (i) an associated electric motor 46 through connectors 45, 47, (ii) the source of electric power 40 through conductive trace 52, and (iii) a ground or chassis connection through the conductive trace 53 and conductor 44. Motor 46 is operatively connected to a window opening and closing mechanism 48, which is operatively attached to window 64. Master switch 32 is electrically connected to (i) an associated electric motor 60 through a connector 59 and a connector 61, (ii) to the source of electric power 40 through conductive trace 52, and (iii) a ground or chassis connection through conductive trace 53 and conductor 44. Motor 60 is operatively connected to a window opening and closing mechanism 62, which is operatively attached to window 64. Master switch 34 is electrically connected to (i) an associated electric motor 66 through a connector 65 and a connector 67, (ii) the source of electric power 40 through conductive trace 52, and (iii) a ground or chassis connection through conductive trace 53 and conductor 44. Motor 66 is operatively connected to a window opening and closing mechanism 68, which is operatively attached to window 70. Master switch 36 is electrically connected to (i) an associated electric motor 72 through a connector 71 and a connector 73, (ii) the source of electric power 40 through conductive trace 52, and (iii) a ground or chassis connection through conductive trace 53 and conductor 44. Motor 72 is operatively connected to a window opening and closing mechanism 74, which is operatively attached to window 76.

The electric motors 46, 60, 66, and 72 are DC motors capable of bi-directional rotation, each motor drawing (i) approximately 8 amps during normal operation, i.e. normal opening or closing an associated window, and (ii) approximately 25 amps during a motor stall condition. Motors 46, 60, 66, 72 and their associated window opening and closing mechanisms 48, 62, 68, 74 operatively cooperate to open and close their respective windows 24, 64, 70, 76 using one of any method known in the art.

Figure 3:
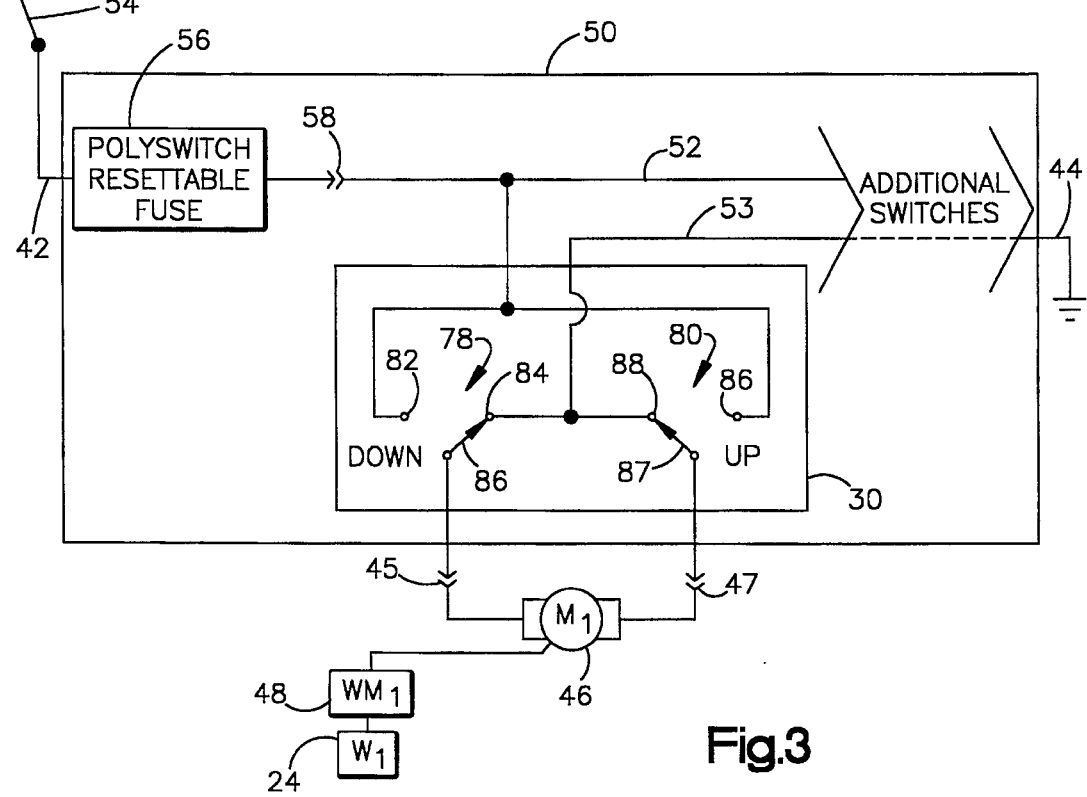
FIG. 3 is a schematic representation of a typical bi-directional power window motor control switch in the system of FIG. 2.

Referring to FIG. 3, master switch 30 includes down electrical contacts 78 and up electrical contacts 80. The down electrical contacts 78 include a positive contact 82, a moving contact 83, and a ground contact 84. The up electrical contacts 80 include a positive contact 86, a moving contact 87, and a ground contact 88.

Positive contacts 82 and 86 are electrically connected to the source of electric power 40. Specifically, the source of electric power 40 is electrically connected to ignition switch 54. When ignition switch 54 is actuated to an ON condition, power is supplied to the polyswitch resettable fuse 56 through conductor 42. Polyswitch resettable fuse 56 is electrically connected to the conductive trace 52 through jumper terminal 58. Contacts 82 and 86 are electrically connected to the conductive trace 52.

Ground contacts 84 and 88 are electrically connected to the conductive trace 53. Conductive trace 53 is electrically connected to a vehicle chassis or ground connection through conductor 44.

Moveable contact 83 is electrically connected to one terminal of the electric motor 46 through connector 45 and moveable contact 87 is electrically connected to the other terminal of motor 46 through connector 47. The moveable contacts 83 and 87 are operatively connected to a mechanical actuator (not shown) which resiliently biases moveable contacts 83, 87 to electrical contact with ground contacts 84 and 88. The resiliently biased mechanical actuator may be one of any known in the art.

Upon the application of a force to the mechanical actuator of the switch 30 in a first direction, corresponding to an upward (closing) window direction, moveable contact 87 conductively contacts positive contact 86. Moveable contact 83 remains in conductive contact with ground contact 84. The supply of power through motor 46 from terminal 86 through connector 47, exiting the motor 46 through connector 45 to ground contact 84, will cause motor rotation in a first direction. The rotational direction of the motor 46, in operative relationship with open/close mechanism 48, raises (closes) window 24.

When the application of force to the mechanical actuator of switch 30 is in a second different direction, corresponding to a downward (opening) window direction, the moveable contact 83 conductively contacts positive contact 82. Moveable contact 87 remains in conductive contact with ground contact 88. The supply of power through motor 46 from terminal 82 through connector 45, exiting the motor 46 through connector 47 to ground contact 88, will cause motor rotation in an opposite direction. The opposite rotational direction of motor 46, in operative relationship with open/close mechanism 48, lowers (opens) window 24. It is to be understood that normal operation of the mechanical actuator of switch 30 may position only one of the moveable contacts, 83 or 87, at a time in conductive contact with their associated positive contact 82 or 86, as is well known in the art. Master switches 38 all operate in a similar manner.

As mentioned above, during normal operation, when opening or closing of a window the associated motor circuit draws electrical current of approximately 8 amps. If all four master switches 38 are simultaneously actuated in a normally operating condition, an electrical current of approximately 32 amps may be present in electrically conductive trace 52. During a motor stall condition each circuit draws approximately 25 amps of electrical current. If all four master switches 38 are simultaneously actuated and a motor stall condition is present in each circuit, a foreseeable electrical current of approximately 100 amps may be present in electrically conductive trace 52. Therefore, typical design of printed circuit board 50 and conductive circuit traces 52, 53 includes consideration of foreseeable current values up to 100 amps.

A polyswitch resettable fuse 56 is used to limit current in conductive trace 52 on circuit board 50. Preferably, the switching temperature of resistance for the polyswitch resettable fuse 56 is selected to permit flow of current (i) greater than the sum of normal operating current for each motor circuit, i.e. a current value greater than approximately 32 amps, and (ii) less than the sum of foreseeable motor stall current i.e. a current value up to 100 amps. For example, the polyswitch resettable fuse 56 may be designed to have a resistance switching temperature corresponding to current levels greater than 40 amps. Should current levels on circuit board 50 exceed 40 amps, internal $I^2R$ heating occurs in the polyswitch resettable fuse 56. Once the temperature of the polyswitch resettable fuse 56 exceeds the resistance switching temperature the electrical resistance of the fuse increases substantially, thereby reducing current flow to a "trickle current." This provides overcurrent protection for the circuit board 50. Overcurrent protection by limiting current levels to less than 40 amps on the circuit board 50 permits design of conductive traces and electrical components which are able to conduct currents of 40 amps or less without sustaining damage due to overcurrent. A circuit board without such limiting overcurrent protection is typically designed to withstand foreseeable currents, e.g. up to 100 amps for multiple motor stall conditions. Locating the polyswitch resettable fuse 56 between the power source 40 and on the circuit board 50 permits design of the conductive traces 52, 53 and the circuit board electrical components for normal operating currents instead of foreseeable motor stall current levels. A circuit board conductive trace designed to carry 40 amps is thinner, i.e. more narrow, than a circuit board conductive trace capable of carrying 100 amps. As a result, the more narrow 40 amp conductive traces occupy less area on the circuit board, thereby, allowing the board size to be reduced. Since the polyswitch resettable fuse need not be replaced upon operation, the polyswitch resettable fuse may be placed in a location which is not easily accessible. For example, the polyswitch resettable fuse 56 is operatively mounted on the circuit board 50 and connected in series, as described above, between the power supply 40 and the conductive trace 52. This is due to the resettable characteristic of a polyswitch resettable fuse which "automatically" resets allowing normal operating current levels to flow once the overcurrent causing condition has ceased. Such an arrangement provides the desired overcurrent protection to conductive traces 52, 53 and other electrical components on the circuit board 50.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:

a plurality of automobile window motors, each one of said motors drawing a first, lesser amount of electric current when in a normal operating condition and drawing a second, substantially greater amount of electric current when in a stall condition;

a printed circuit board;

a plurality of automobile window switches mounted on said printed circuit board, each one of said switches being electrically connected with a respective one of said motors for controlling said one motor;

a source of electric power electrically connected with said circuit board;

at least one conductive trace on said circuit board for carrying current from said electric power source to all of said plurality of switches, said at least one conductive trace having a first current-carrying capacity; and a polyswitch resettable fuse on said circuit board, said polyswitch resettable fuse being electrically connected in series between said electric power source and said at least one conductive trace;

said polyswitch resettable fuse having a first condition enabling substantially unimpeded current flow through said fuse when said polyswitch resettable fuse has a temperature less than a predetermined temperature;

said polyswitch resettable fuse being in the first condition when the amount of current passing through said polyswitch resettable fuse does not exceed said first current-carrying capacity of said at least one conductive trace;

said polyswitch resettable fuse having a second condition substantially blocking current flow through said polyswitch resettable fuse when said polyswitch resettable fuse has a temperature greater than said predetermined temperature;

said polyswitch resettable fuse changing from the first condition to the second condition when the amount of current flowing through said polyswitch resettable fuse exceeds said first current-carrying capacity of said at least one conductive trace.

2. An apparatus as set forth in claim 1 wherein said first current-carrying capacity of said at least one conductive trace is (a) greater than the sum of the currents drawn by all of said plurality of motors when all of said plurality of motors are in a normal operating condition, and is (b) greater than the amount of current drawn by any single one of said plurality of motors when said any single one motor is in a stall condition, and is (c) less than the sum of the currents drawn by any two of said plurality of motors when both of said any two motors are in a stall condition.

* * * * *